(12) United States Patent
Kotzin et al.

(10) Patent No.: US 6,907,019 B2
(45) Date of Patent: Jun. 14, 2005

(54) COMMUNICATION CONTROLLER AND METHOD FOR MANAGING THE TRAFFIC FLOW OF A COMMUNICATION CONNECTION DURING A CELL RESELECTION

(75) Inventors: Michael D. Kotzin, Buffalo Grove, IL (US); Charles P. Binzel, Bristol, WI (US); Mark E. Pecen, Palatine, IL (US); Stephen L. Spear, Skokie, IL (US)

(73) Assignee: Motorola Inc., Schaumburg, IL (US)

( * ) Notice: Subject to any disclaimer, the term of this patent is extended or adjusted under 35 U.S.C. 154(b) by 101 days.

(21) Appl. No.: 10/647,776

(22) Filed: Aug. 25, 2003

(65) Prior Publication Data

US 2005/0047370 A1 Mar. 3, 2005

(51) Int. Cl.$^7$ ................................................. H04Q 7/00
(52) U.S. Cl. ....................................... 370/332; 455/442
(58) Field of Search ................................. 370/329–333, 370/338; 455/436–444

(56) References Cited

U.S. PATENT DOCUMENTS

| | | | | |
|---|---|---|---|---|
| 5,754,945 A | * | 5/1998 | Lin et al. | 455/436 |
| 5,991,626 A | * | 11/1999 | Hinz et al. | 455/436 |
| 6,141,553 A | * | 10/2000 | Fernandez et al. | 455/436 |
| 6,157,845 A | | 12/2000 | Henry et al. | |
| 6,374,112 B1 | * | 4/2002 | Widegren et al. | 455/452.2 |
| 6,590,880 B1 | | 7/2003 | Maenpaa et al. | |
| 6,594,238 B1 | * | 7/2003 | Wallentin et al. | 370/252 |
| 6,603,972 B1 | | 8/2003 | Sawyer | |
| 2002/0118662 A1 | | 8/2002 | Sheynman et al. | |
| 2003/0092445 A1 | | 5/2003 | Timonen et al. | |

FOREIGN PATENT DOCUMENTS

WO  WO 01/76162 A1  10/2001

OTHER PUBLICATIONS

Tripathi et al, Handoff in Cellular Systems, IEEE, pp. 26–37, 1998.*
Wong et al, A Pattern Recognition System for Handoff Algorithms, IEEE, pp. 1301–1312, 2000.*
Pahlavan et al, Handoff in Hybrid Mobile Data Networks, IEEE, pp. 34–47, 2000.*
GSM 3GPP TS 29.061 V3.10.0 (Jun. 2002) Technical Specification; 3$^{rd}$ Generation Partnership Project; Technical Specification Group Core Network; Packet Domain; Interworking between the Public Land Mobile Network (PLMN) supporting Packet Based Services and Packet Data Networks (PDN) (Release 1999).

* cited by examiner

*Primary Examiner*—Frank Duong
(74) *Attorney, Agent, or Firm*—Lawrence J. Chapa

(57) ABSTRACT

The present invention provides a method for managing in a mobile subscriber the traffic flow of a communication connection during a cell reselection. The method includes communicating via a communication connection with a first cell, and monitoring communication conditions, while communicating with the first cell. An approximate time is then determined, when conditions associated with the flow of communication via the communication connection with the first cell is consistent with transferring the flow of communication to a communication connection with a second cell. The mobile subscriber then establishes a communication connection with the second cell, while maintaining the communication connection with the first cell. The method further includes routing the flow of the communication from the communication connection with the first cell to the communication connection with the second cell, and releasing by the mobile subscriber the communication connection with the first cell, proximate the time that the flow of communication is routed from the communication connection with the first cell to the communication connection with the second cell.

32 Claims, 4 Drawing Sheets

COMMUNICATION CONTROLLER AND METHOD FOR MANAGING THE TRAFFIC FLOW OF A COMMUNICATION CONNECTION DURING A CELL RESELECTION

FIELD OF THE INVENTION

The present invention relates generally to controlling the communication connections between a mobile subscriber and one or more cells as the mobile experiences communication conditions consistent with a cell reselection, and more particularly, to establishing a second communication connection via a new anticipated serving cell and forwarding the traffic flow to the new cell prior to terminating the connection with the previous serving cell in anticipation of a reselection.

BACKGROUND OF THE INVENTION

Mobile subscribers use wireless communication devices to communicate over a cellular wireless communication network by transmitting and receiving wireless signals between the wireless communication devices and one or more base stations. The one or more base stations are generally spread throughout an area of coverage, which are often divided into one or more smaller areas called cells.

As mobile subscribers move from one cell to another cell, it often becomes necessary to communicate with the network via different base stations. The need to transition from one base station to another base station often coincides with the mobile subscriber moving further away from and/or out of transmission range with a first base station and closer to and/or within transmission range with a second base station.

If the mobile subscriber is communicating with the network, when it becomes necessary to switch from one base station to another, different types of networks handle the transition in different ways. Sometimes, the manner in which the transition is handled is dependent upon the particular operating mode and/or the type of communication protocol being used. In many instances, the manner in which the transition is handled is a by-product of the originally intended services, which were to be supported by a particular network, operating mode and/or protocol. However increasingly, networks, operating modes and/or protocols are being expected to support types of communication, that they were never originally intended to support.

One such example includes voice communications over a packet network. Packet data networks were historically principally intended to transmit text or data files, where reliability was more important than small transmission delays. Alternatively with voice communications, small data losses are generally more tolerable than small transmission delays. As a result, when many packet data networks were developed, and corresponding network infrastructure later deployed, events which produced delays in transmission were allowed to occur, while a greater focus was placed on minimizing data losses.

An example of an event, which in at least some data packet networks, results in some transmission interruption associated with a delay, includes the handling of a transition from one base station to another, for facilitating further communication with the network. In at least one packet data network, such as general packet radio services (GPRS), a mobile subscriber will attempt to establish communication with a second base station only after communication with the first base station is lost. This can result in a delay of continued communications, which is often greater than several seconds. During real time voice type communications, a delay of this magnitude is largely viewed as intolerable. This presents special challenges for data services, which attempt to communicate real time voice data via a packet data network, such as push to talk, which provides walkie talkie-type simplex communication, and voice over IP (internet protocol), which attempts to provide more traditional type duplex voice communications over the packet data network.

As a result, it would be beneficial to develop techniques, which minimize the transmission delays, including any delays associated with transitioning between a first base station and a second base station. Still further, it would be beneficial to develop techniques, which minimize transmission delays, in a manner which can be implemented with minimal impact on existing infrastructure.

SUMMARY OF THE INVENTION

The present invention provides a method for managing in a mobile subscriber the traffic flow of a communication connection during a cell reselection. The method includes communicating via a communication connection with a first cell, and monitoring communication conditions, while communicating with the first cell. An approximate time is then determined, when conditions associated with the flow of communication via the communication connection with the first cell is consistent with transferring the flow of communication to a communication connection with a second cell. The mobile subscriber then establishes a communication connection with the second cell, while maintaining the communication connection with the first cell. The method further includes routing the flow of the communication from the communication connection with the first cell to the communication connection with the second cell, and releasing by the mobile subscriber the communication connection with the first cell, proximate the time that the flow of communication is routed from the communication connection with the first cell to the communication connection with the second cell.

In at least one embodiment, the method additionally includes receiving authorization from the network for establishing a second communication connection, as part of establishing a communication connection with the second cell.

The present invention further provides a communication controller for use in a mobile subscriber. The communication controller includes a reselection controller, interface circuitry, coupled to the reselection controller, for establishing a communication connection with one or more cells, and a cell reselection predictor coupled to the reselection controller. The reselection controller is adapted for establishing a communication connection with a second cell, prior to releasing the communication connection with the first cell, in response to the cell reselection predictor predicting a reselection.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
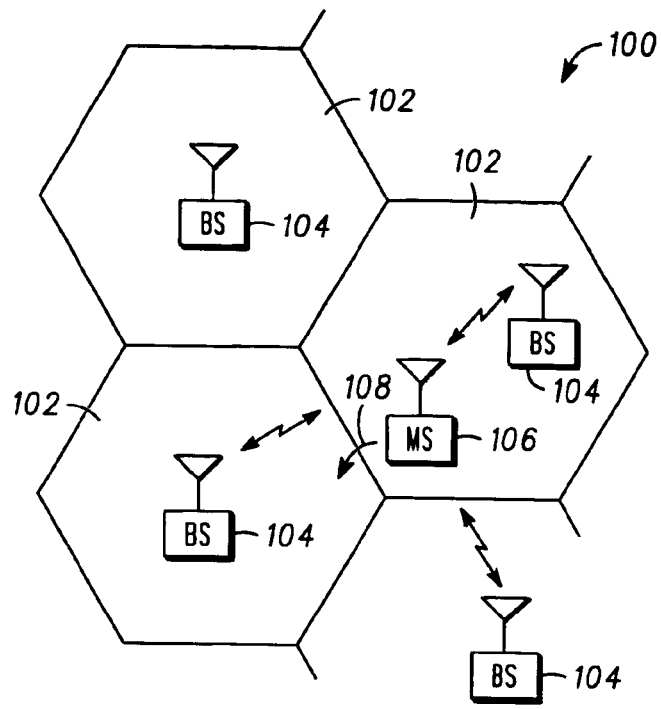
FIG. 1 is an exemplary topographical view of a geographical region representing a portion of the coverage area for a wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view of portions of a wireless communication system. The topographical view 100 includes a plurality of cells 102 pictorially represented as hexagons. The hexagons are only rough approximations, where in reality the area of transmission for each of the cells 102 is not so uniformly defined. Each cell 102 is typically served by one or more base stations (BS) 104, referred to as a serving station, which communicates with mobile stations (MS) 106 traveling within the corresponding cell 102.

Generally, the further a mobile station 106 moves away from the serving base station 104 the weaker the signal gets. Conversely, as a mobile station 106 moves toward a base station 104 the signal typically becomes stronger. As a mobile station 106 continues to move 108 away from a serving base station 104 and towards a base station 104 of a neighboring cell 102, at some point it will become desirable to transfer control of the continued communication to the base station 104 of the neighboring cell 102. The decision to transfer control is typically determined based upon the relative strength of the signal received from the serving base station and the base stations of each of the nearby cells 102. Consequently, wireless communication devices operating in association with several over the air operating standards monitor the relative strength of signals from both the serving cell and the one or more nearby neighboring cells.

If the mobile station 106 is engaged in a packet data communication, such as general packet radio services (GPRS) type data connection, when control is to be transferred from the serving base station to a base station of one of the neighboring cells, initiation of a connection to the previously neighboring base station is attempted, only after the connection with the previously serving base station is dropped and/or terminated. This is commonly referred to as a reselection. Alternatively, the present invention attempts to establish a second communication connection with the new anticipated serving cell and route traffic via the new connection, prior to dropping the first communication connection, in an attempt to minimize any transmission discontinuity, and the delay associated with reestablishing a new connection during a reselection. Examples of where real time voice type communications over a packet network would be beneficial include implementations of voice over IP and push to talk.

Figure 2:
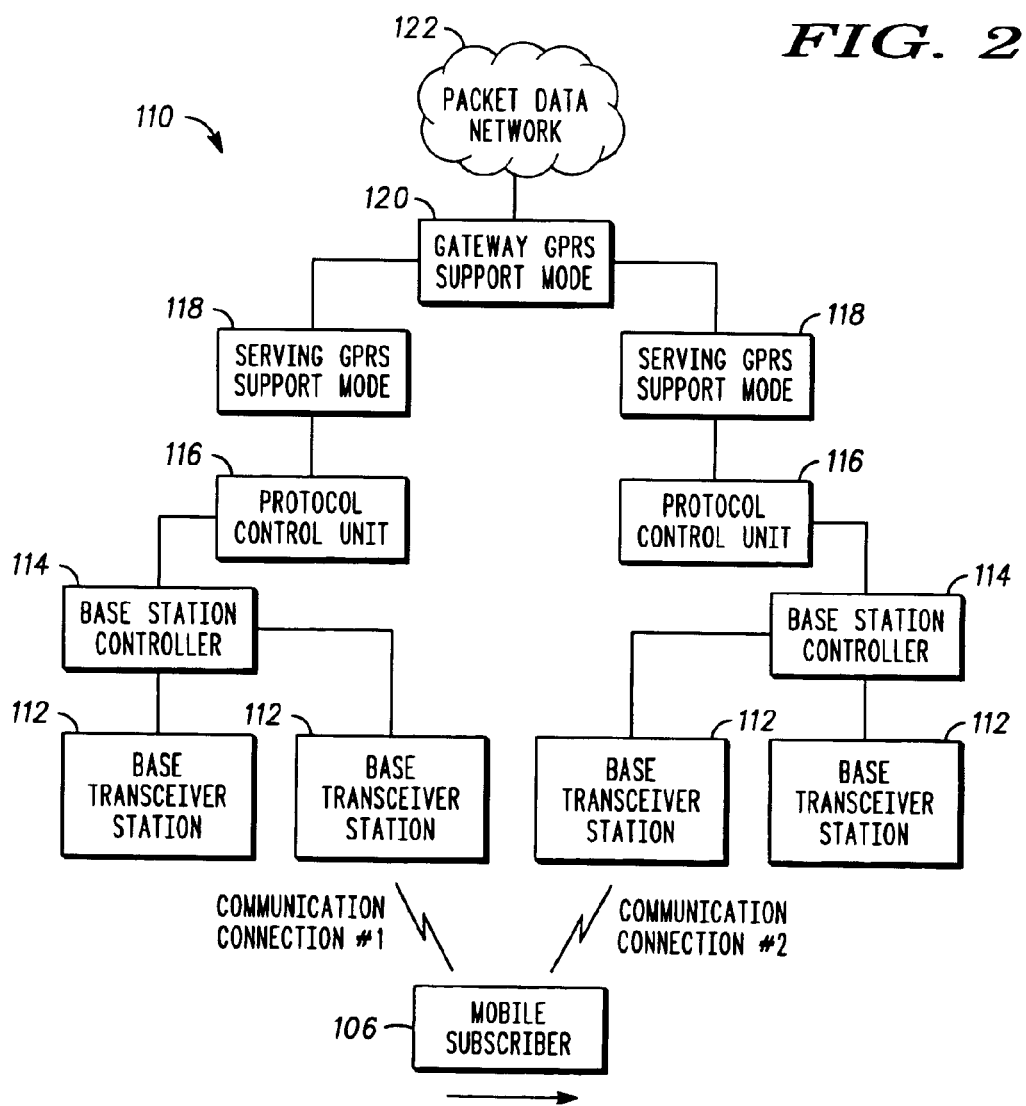
FIG. 2 is a block diagram of an exemplary packet data network.

FIG. 2 illustrates a block diagram 110 of an exemplary packet data network Many of the network elements are consistent with the global system for mobile communications (GSM) standard, and more specifically are consistent with a general packet radio services (GPRS) standard.

The exemplary packet data network 110 includes multiple base transceiver stations 112, which correspond to the base stations illustrated in FIG. 1. The base transceiver stations are coupled to one or more base station controllers 114, which in turn are coupled to corresponding protocol control units 116. The protocol control units 116 are each coupled to a corresponding one of one or more serving GPRS support nodes (SGSN) 118, which are each coupled to a corresponding one of one or more gateway GPRS support nodes (GGSN) 120. The gateway GPRS support nodes 120 in turn are coupled to the packet data network 122, such as the Internet. Often times an application server is coupled to the packet data network 122, which facilitates the routing of the voice data packets to the one or more intended recipients.

In the illustrated embodiment, a pair of communication connections 124 are shown, which in the illustrated embodiment are associated with base stations, which are part of separate branches. While the separate branches in the illustrated embodiment join together at the gateway GPRS support node 120, disparate branches in other instances can also join together at a common serving GPRS support node 118 or a common base station controller 114.

In some networks, there are limitations as to the number of different cells that a mobile subscriber can be simultaneously connected to. In at least some instances, this is one technique that is used to limit unauthorized access to the network. However in the present instance, it is expressly desired to maintain multiple connections to the network via connection through different cells. Consequently, as part of establishing a communication connection through a second cell, while maintaining a communication connection through a first cell. A request for authorization to make multiple communication connections can be made to the network, and correspondingly authorization received from the network. In some instances the authorization may be limited to certain types of connections, for example connection which support push to talk or voice over IP. Alternatively, other types of connections may be granted similar types of authorization. For example, it may be beneficial to similarly treat any data flow associated with a communication connection that, similar to the above noted voice-type communications, is also delay sensitive.

Figure 3:
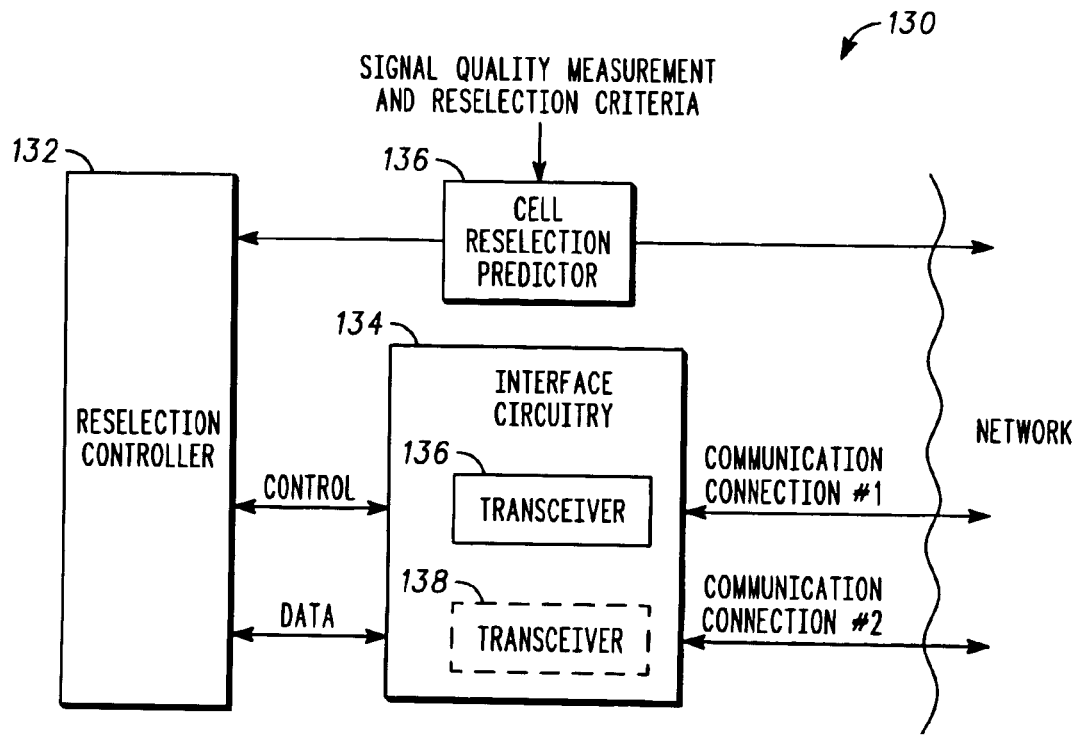
FIG. 3 is a block diagram of a communication controller, in accordance with at least one embodiment of the present invention.

FIG. 3 illustrates a block diagram of a communication controller 130, in accordance with at least one embodiment of the present invention. Generally, the communication controller is adapted to manage in a mobile subscriber the traffic flow of a communication connection during a cell reselection. More specifically, the communication controller includes a reselection controller 132, interface circuitry 134, and a cell reselection predictor 136.

The cell reselection predictor 136 monitors communication conditions, while communicating via a communication connection with a first cell, by receiving signal quality measurements and any other reselection criteria. In at least one embodiment, the signal quality measurements include signal strength measurements. Alternatively, the signal quality measurements can include other signal quality measurements, such as signal to noise ratio, bit error rate, etc. By monitoring the change in the signal quality over time and comparing the corresponding rate of change to a predetermined threshold value, it can be anticipated and/or predicted when a reselection may become necessary. Prior to the predicted point in time that a reselection is anticipated to become necessary, the reselection controller 132 will establish a communication connection with a second cell, while maintaining connection with the first cell.

The reselection controller 132 is coupled to the network via interface circuitry 134. The interface circuitry 134 includes at least one transceiver 136, which has one or more control inputs, associated with controlling the frequency and timing of the signals received and transmitted by the transceiver 136. In many instances, a single transceiver is sufficient for maintaining multiple communication connection. This can be the case, where the communication via a communication connection is supported via one or more slot assignments, which is a subset of the available slots. Non overlapping subsets of slots can be used to maintain multiple communication connections. In other instances, additional optional transceivers 138 can be used, which can be used to separately receive multiple signals, even signals sharing a common time slot.

Where a single transceiver is used to support multiple communication connections, non-overlapping slot assignments are still further beneficial, this is because communication connections with multiple base transceiver stations are not always synchronized or time aligned. Consequently, it may be further necessary to take into account different offsets and/or timing advances in insuring that assigned time slots are non-overlapping. In at least one instance, the communication occurring over an associated communication connection having the greater timing advance will be defined to precede the communication over a communication connection having a lesser timing advance.

Figure 4:
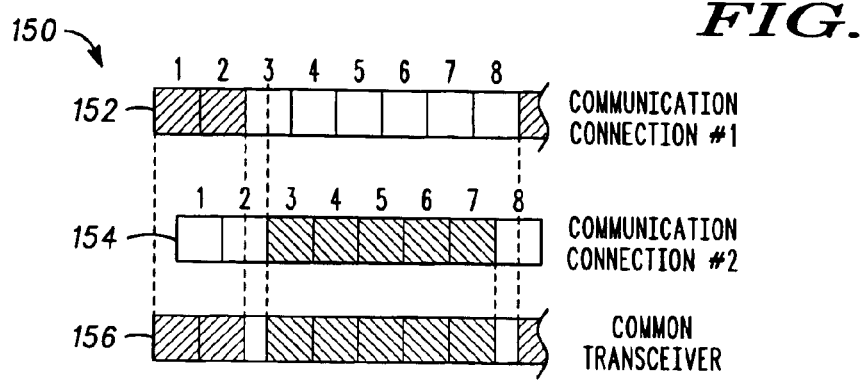
FIG. 4 is an exemplary slot assignment for a pair of communication channels.

FIG. 4 is a timing diagram 150, which illustrates an example of non-overlapping slot assignments 156 associated with at least a pair of communication connections 152 and 154. In the illustrated embodiment the first communication connection 152 has the greater timing advance.

Generally, once a slot assignment is established, the same slot assignment will reoccur in subsequent frames. However slot assignments can be readjusted to accommodate different levels of communications. For example, it may be beneficial to reduce signal quality and assign fewer time slots to an existing communication, in order to make more slots available to a second communication connection with which to further establish communication. Still further a communication connection can be reduced to half rate, which allows for the use of time slots on alternate frames, which in turn will free up still further slots. Non assigned slots can also be used to monitor communication conditions.

Figure 5:
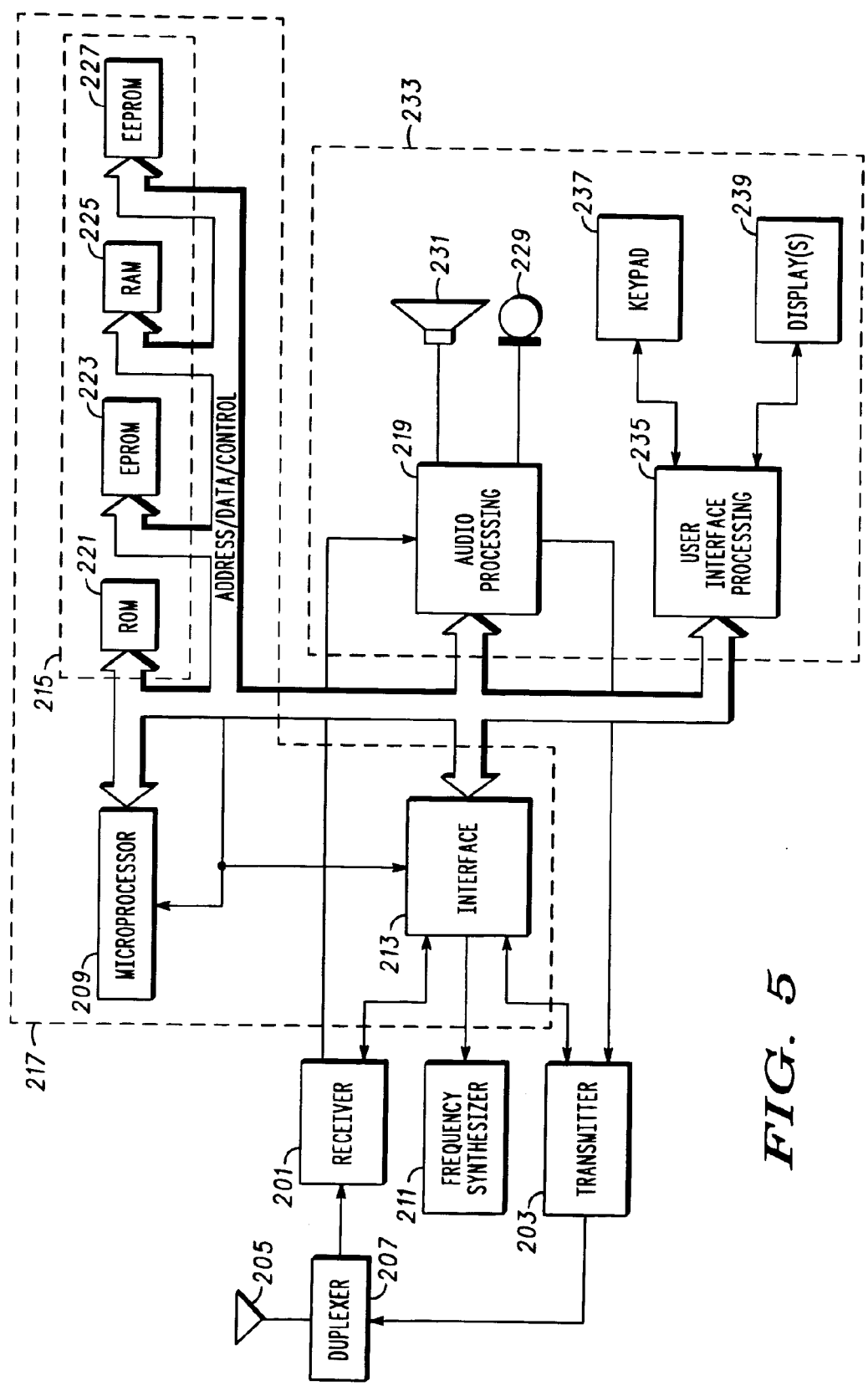
FIG. 5 is a block diagram of least one embodiment of the wireless communication device, which could be used to incorporate the present invention.
Figure 6:
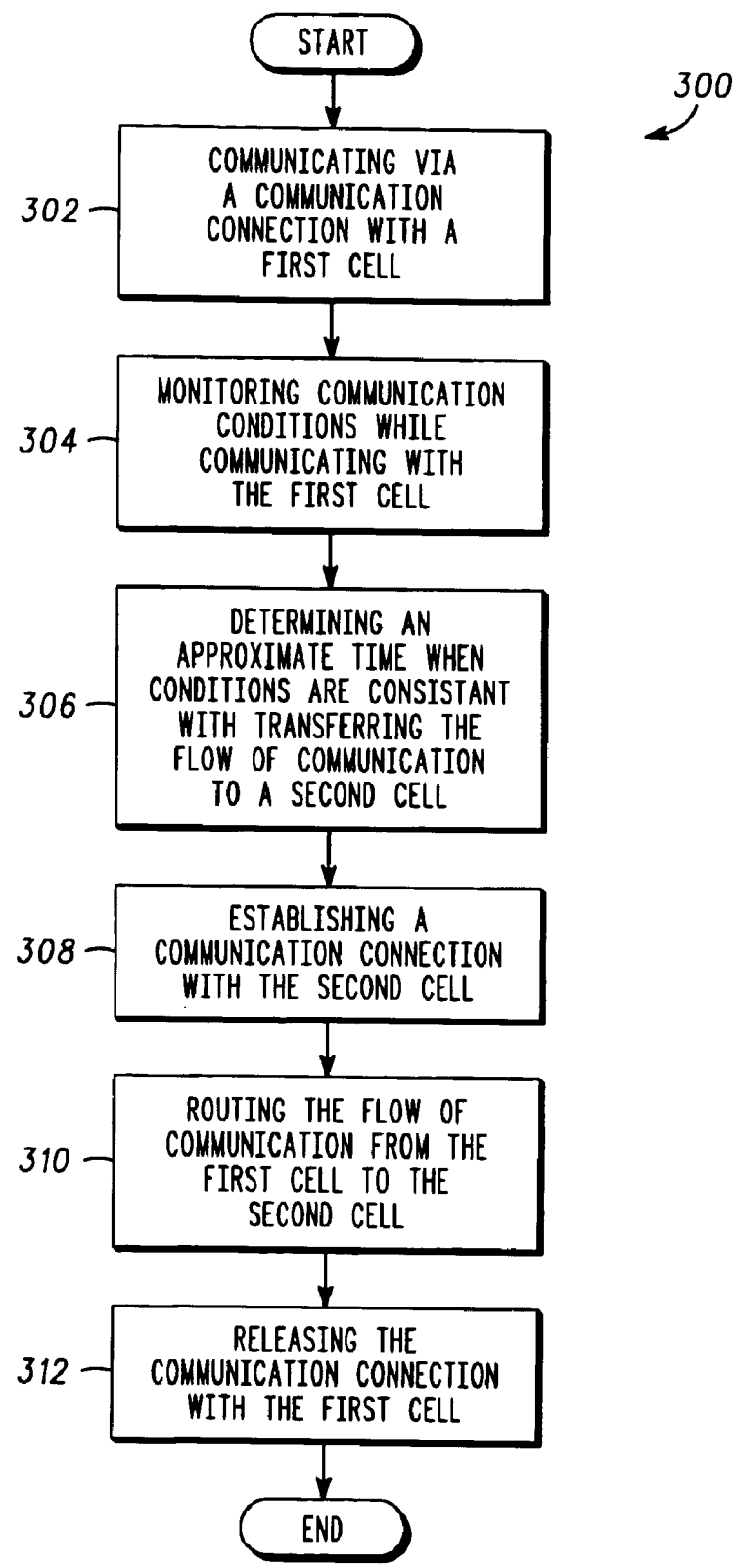
FIG. 6 is a flow diagram of a method for maintaining a communication connection during a cell reselection, in accordance with at least one embodiment of the present invention.

In at least one embodiment, the communication controller of the present invention is incorporated as part of a wireless communication device, such as a cellular telephone. FIG. 5 illustrate at least one exemplary embodiment of a wireless communication device, which could be used to incorporate the present invention. The wireless communication device 200 includes a radio receiver 201 and a transmitter 203. Both the receiver 201 and the transmitter 203 are coupled to an antenna 205 of the wireless communication device by way of a duplexer 207. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

In the preferred embodiment, the microprocessor 209 forms part of the processing unit, which in conjunction with the interface circuitry 213 performs the necessary processing functions under the control of program instructions stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Identifying features of the wireless communication device are typically stored in EEPROM 227 (which may also be stored in the microprocessor in an on-board EEPROM, if available) and can include the number assignment (NAM) required for operation in a conventional cellular system.

To the extent that the communication controller is implemented in hardware, Is the logic elements could be located in interface 213 and or make use of memory elements in memory section 215. To the extent that the communication controller is implemented using programming instructions, the programming instruction could be stored in memory section 215 for execution by one or more processors including microprocessor 209.

Control of user audio, the microphone 229 and the speaker 231, is controlled by audio processing circuitry 219, which forms part of a user interface circuit 233. The user interface circuit 233 additionally includes user interface processing circuitry 235, which manages the operation of any keypad(s) 237 and/or display(s) 239. It is further envisioned that any keypad operation could be included as part of a touch 25 sensitive display.

FIG. 7 illustrates a flow diagram 300 of a method for managing in a mobile subscriber the traffic flow of a communication connection during a cell reselection, in accordance with at least one aspect of the present invention. The method includes communicating 302 via a communication connection with a first cell.

Communication conditions are then monitored 304, while communicating with the first cell. An approximate time, when communication conditions are consistent with transferring the flow of communication to a communication connection with a second cell is then determined 306. The method then provides for establishing 308 a communication connection with the second cell, while maintaining the communication connection with the first cell. The flow of communication from the communication connection with the first cell is then routed 310 to the communication connection with the second cell. The mobile then releases 312 the communication connection with the first cell at a time proximate the point in time that the flow is routed from the communication connection with the first cell to the communication connection with the second cell.

In at least one embodiment, the method additionally includes the mobile subscriber receiving authorization from the network for establishing a second communication connection, as part of establishing a communication connection with the second cell.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing in a mobile subscriber the traffic flow of a communication connection during a cell reselection, the method comprising:
   communicating via a communication connection with a first cell;
   monitoring communication conditions, while communicating with the first cell;
   determining an approximate time when conditions associated with the flow of communication via the communication connection with the first cell is consistent with transferring the flow of communication to a communication connection with a second cell;
   establishing by the mobile subscriber a communication connection with the second cell, while maintaining the communication connection with the first cell;
   routing the flow of the communication from the communication connection with the first cell to the communication connection with the second cell; and
   releasing by the mobile subscriber the communication connection with the first cell, proximate the time that the flow of communication is routed from the communication connection with the first cell to the communication connection with the second cell.

2. A method in accordance with claim 1 wherein the communication connections with each of the first cell and the second cell are packet data communication connections.

3. A method in accordance with claim 2 wherein the packet data communication connections use a communication protocol conforming to at least one of a general packet radio service (GPRS) standard and an enhanced data global evolution (EDGE) standard.

4. A method in accordance with claim 2 wherein the at least some of the packets of data communicated over the packet data communication connection include packetized voice data.

5. A method in accordance with claim 4 wherein the voice data is communicated as part of a push to talk (PIT) call session.

6. A method in accordance with claim 4 wherein the voice data is communicated as part of a voice over internet protocol (VoIP) call session.

7. A method in accordance with claim 2 wherein the packet data communication connections with each of the first cell and the second cell are routed to a packet data network via a combining server.

8. A method in accordance with claim 1 wherein the communication connection with each of the first cell and the second cell support communication during one or more of a plurality of designated time slots.

9. A method in accordance with claim 8 wherein the communication connection with the second cell is established during time slots, which are not used as part of the communication connection with the first cell.

10. A method in accordance with claim 8 wherein prior to establishing a communication connection with a second cell, reducing the number of time slots used for the communication connection with the first cell.

11. A method in accordance with claim 8 wherein communicating via a communication connection with a first cell includes communicating via a communication connection with a first cell using a full rate mode.

12. A method in accordance with claim 11 wherein prior to establishing a communication connection with a second cell, switching the mode used for the communication connection with the first cell to a half rate mode.

13. A method in accordance with claim 8 wherein establishing a communication connection with the second cell includes using one or more time slots which do not overlap in time with the time slots used in the first cell.

14. A method in accordance with claim 13 wherein, when communicating with a first cell and a second cell in adjacent time slots, the communication to the cell with the larger timing advance precedes the communication to the cell with the shorter timing advance to accommodate the timing differential between the start times of the time slots used with the first cell and the second cell.

15. A method in accordance with claim 1 wherein the point in time that the flow of communication from the communication connection with the first cell to the communication connection with the second cell is scheduled to occur at a predetermined time, which occurs after the communication connection with the second cell is established.

16. A method in accordance with claim 1 wherein each of the communication connection with the first cell and the communication connection with the second cell is associated with a routing address.

17. A method in accordance with claim 16 wherein the routing address is an internet protocol address.

18. A method in accordance with claim 16 wherein each of the communication connection with the first cell and the communication connection with the second cell is associated with a different address.

19. A method in accordance with claim 1 wherein monitoring communication conditions includes measuring the quality of signals received from a serving cell including the first cell, and measuring the quality of the signals received from one or more neighboring cells including the second cell.

20. A method in accordance with claim 19 wherein determining a time when conditions are consistent with executing a handover includes comparing at least some of the signal quality measurements of the signals received from the serving cell with at least one of a predetermined threshold and one or more of the signal quality measurements of the signals received from the one or more neighboring cells.

21. A method in accordance with claim 19 wherein at least some of the signal quality measurements includes a received signal strength indicator (RSSI).

22. A method in accordance with claim 1 wherein the system associated with the first cell is synchronized with the system associated with the second cell.

23. A method in accordance with claim 1 wherein establishing a communication connection with the second cell includes receiving authorization from the network for establishing a second communication connection.

24. A communication controller for use in a mobile subscriber comprising:
   a reselection controller;
   interface circuitry, coupled to the reselection controller, for establishing a communication connection with one or more cells; and
   a cell reselection predictor coupled to the reselection controller;
   wherein the reselection controller is adapted for establishing a communication connection with a second cell, prior to releasing the communication connection with the first cell, in response to the cell reselection predictor predicting a reselection.

25. A communication controller in accordance with claim 24 wherein the interface circuitry includes a transceiver having one or more control inputs, and wherein the reselection controller is adapted to adjust the frequency and the timing of the transceiver via the one or more control signals during respective time slots associated with each of the established and non-released communication connections for at least the first cell and the second cell.

26. A communication controller in accordance with claim 24 wherein the interface circuitry includes a pair of transceivers, where at least one of the transceivers is adapted for facilitating a communication connection with the first cell, and where at least another one of the transceivers is adapted for facilitating a communication connection with the second cell.

27. A communication controller in accordance with claim 24 wherein the communication connection is a packet data communication connection.

28. A communication controller in accordance with claim 24 wherein the communication connection includes voice data communicated as part of a push to talk (PIT) call session.

29. A communication controller in accordance with claim 24 wherein the communication connection includes voice data communicated as part of a voice over internet protocol (VoIP) call session.

30. A communication controller in accordance with claim 24 wherein the cell reselection predictor has an input for receiving one or more of signal quality measurements and reselection criteria for one or more signals received from at least one of a serving cell and one or more neighboring cells.

31. A communication controller in accordance with claim 24 incorporated as part of a mobile communication device.

32. A communication controller in accordance with claim 31 wherein the mobile communication device is a cellular telephone.

* * * * *